(12) United States Patent
Sun

(10) Patent No.: US 11,408,658 B2
(45) Date of Patent: Aug. 9, 2022

(54) POWER MANAGEMENT FOR CO2 TRANSPORTATION REFRIGERATION SYSTEM

(71) Applicant: Carrier Corporation, Palm Beach Gardens, FL (US)

(72) Inventor: Jian Sun, Fayetteville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 146 days.

(21) Appl. No.: 16/076,478

(22) PCT Filed: Feb. 1, 2017

(86) PCT No.: PCT/US2017/015977
§ 371 (c)(1),
(2) Date: Aug. 8, 2018

(87) PCT Pub. No.: WO2017/139148
PCT Pub. Date: Aug. 17, 2017

(65) Prior Publication Data
US 2019/0041111 A1    Feb. 7, 2019

Related U.S. Application Data

(60) Provisional application No. 62/293,407, filed on Feb. 10, 2016.

(51) Int. Cl.
*F25B 49/02* (2006.01)
*B60H 1/32* (2006.01)
(Continued)

(52) U.S. Cl.
CPC ......... *F25B 49/022* (2013.01); *B60H 1/3208* (2013.01); *B60H 1/3232* (2013.01);
(Continued)

(58) Field of Classification Search
CPC ............ B60H 1/3208; B60H 2001/325; B60H 2001/3285; B60H 1/3232; F25B 2327/001;
(Continued)

(56) References Cited

U.S. PATENT DOCUMENTS

| 4,601,172 A | * | 7/1986 | Stotts ........................ F02G 1/06 60/517 |
| 5,245,836 A | | 9/1993 | Lorentzen et al. |

(Continued)

FOREIGN PATENT DOCUMENTS

| DE | 10324955 A1 | 1/2005 | | |
| GB | 1304014 A | * 1/1973 | ........... B64C 27/006 |

(Continued)

OTHER PUBLICATIONS

International Search Report for International Application No. PCT/US2017/015977; International Filing Date Feb. 1, 2017; dated May 2, 2017; 5 Pages.

(Continued)

*Primary Examiner* — Tavia Sullens
(74) *Attorney, Agent, or Firm* — Cantor Colburn LLP

(57) ABSTRACT

A refrigeration unit includes an evaporator circulating a flow of refrigerant therethrough to cool a flow of compartment air flowing over the evaporator, a compressor in fluid communication with the evaporator to compress the flow of refrigerant, an engine operably connected to the compressor to drive operation of the compressor, an expansion device in fluid communication with the flow of refrigerant, and a controller operably connected to at least the engine and the expansion device. The controller is configured to determine an available power to drive the compressor, determine a compressor discharge pressure upper limit based on the available power, compare the compressor discharge pressure (Continued)

upper limit to a requested compressor discharge pressure, and initiate adjustment of the expansion device such that an actual compressor discharge pressure is the lesser of the requested compressor discharge pressure or the compressor discharge pressure upper limit.

11 Claims, 3 Drawing Sheets

(51) Int. Cl.
*F25D 29/00* (2006.01)
*F25B 27/00* (2006.01)

(52) U.S. Cl.
CPC .............. *F25B 27/00* (2013.01); *F25B 49/02* (2013.01); *F25B 49/027* (2013.01); *F25D 29/003* (2013.01); *B60H 2001/325* (2013.01); *B60H 2001/3285* (2013.01); *F25B 2327/001* (2013.01); *F25B 2500/19* (2013.01); *F25B 2600/0271* (2013.01); *F25B 2600/2513* (2013.01); *F25B 2700/151* (2013.01); *F25B 2700/1931* (2013.01); *F25B 2700/1933* (2013.01)

(58) Field of Classification Search
CPC ...... F25B 2600/0271; F25B 2600/2513; F25B 49/022; F25B 49/02; F25B 49/027; F25B 49/025; F25B 27/00; F25B 2700/151; F25B 2700/1931; F25B 2700/1933; F25D 29/003
See application file for complete search history.

(56) References Cited

U.S. PATENT DOCUMENTS

| 5,557,938 | A | | 9/1996 | Hanson et al. | |
|---|---|---|---|---|---|
| 5,803,627 | A | | 9/1998 | Paranjpe | |
| 5,806,327 | A | * | 9/1998 | Lord | F25B 49/022 62/115 |
| 6,230,506 | B1 | * | 5/2001 | Nishida | B60H 1/3205 62/160 |
| 6,321,549 | B1 | | 11/2001 | Reason et al. | |
| 6,343,486 | B1 | | 2/2002 | Mizukami | |
| 6,487,869 | B1 | * | 12/2002 | Sulc | B60H 1/3205 62/228.4 |
| 6,505,476 | B1 | | 1/2003 | Nishida et al. | |
| 6,523,360 | B2 | | 2/2003 | Watanabe et al. | |
| 7,600,390 | B2 | | 10/2009 | Manole | |
| 8,745,996 | B2 | | 6/2014 | Qiao et al. | |
| 2002/0029096 | A1 | * | 3/2002 | Takai | F24F 11/30 700/276 |
| 2003/0233839 | A1 | * | 12/2003 | Hirose | B60H 1/3208 62/186 |
| 2005/0284164 | A1 | | 12/2005 | Ohta | |
| 2009/0145146 | A1 | * | 6/2009 | Wakisaka | B60H 1/3205 62/157 |
| 2010/0281894 | A1 | | 11/2010 | Huff | |
| 2010/0293959 | A1 | * | 11/2010 | Remy | F02C 3/22 60/773 |
| 2011/0048042 | A1 | | 3/2011 | Chen et al. | |
| 2011/0219797 | A1 | | 9/2011 | Taguchi | |
| 2011/0296860 | A1 | * | 12/2011 | Honda | F25B 49/022 62/222 |
| 2012/0227427 | A1 | | 9/2012 | Liu et al. | |
| 2012/0318014 | A1 | | 12/2012 | Huff et al. | |
| 2014/0144164 | A1 | | 5/2014 | Steele et al. | |
| 2015/0000636 | A1 | * | 1/2015 | Stockbridge | F25D 29/003 123/350 |
| 2015/0007552 | A1 | * | 1/2015 | Steele | F01N 3/023 60/274 |
| 2015/0219379 | A1 | | 8/2015 | Sun et al. | |

FOREIGN PATENT DOCUMENTS

| JP | 2002130770 A | 5/2002 |
|---|---|---|
| RU | 142750 U1 | 7/2014 |
| WO | 2014152349 A1 | 9/2014 |

OTHER PUBLICATIONS

Written Opinion for International Application No. PCT/US2017/015977; International Filing Date Feb. 1, 2017; dated May 2, 2017; 5 Pages.

Russian Office Action for Russian Application No. 2018129133/12(046876), dated May 12, 2020, 8 pages.

* cited by examiner

POWER MANAGEMENT FOR CO2 TRANSPORTATION REFRIGERATION SYSTEM

CROSS REFERENCE TO RELATED APPLICATIONS

This application is a National Stage application of PCT/US2017/015977, filed Feb. 1, 2017, which claims the benefit of U.S. Provisional Application No. 62/293,407, filed Feb. 10, 2016, both of which are incorporated by reference in their entirety herein.

BACKGROUND

The subject matter disclosed herein relates generally to the field of transportation refrigeration systems, and more particularly, to power management control of transportation refrigeration systems.

Refrigerant vapor compression systems are well known in the art and commonly used for conditioning air to be supplied to a climate controlled comfort zone within a residence, office building, hospital, school, restaurant or other facility. Refrigerant vapor compression systems are also commonly used in refrigerating air supplied to display cases, merchandisers, freezer cabinets, cold rooms or other perishable/frozen product storage area in commercial establishments. Refrigerant vapor compression systems are also commonly used in transportation refrigeration systems for refrigerating air supplied to a temperature controlled cargo space of a truck, trailer, container or the like for transporting perishable/frozen items by truck, rail, ship or intermodally.

Typical transportation refrigeration systems are operably connected to an engine which, either directly or indirectly through an electrical generator, provides power to drive a compressor of the refrigeration system, as well as power to drive other components of the system, such as condenser fans, evaporator fans, and any other auxiliary components of the transportation refrigeration system. In some operating conditions, power demands from the components, using conventional refrigeration systems controls, may exceed available power from the engine, which may result in an undesirable engine stall condition.

BRIEF SUMMARY

In one embodiment, a method of controlling a refrigeration unit includes determining an available power to drive a compressor of the refrigeration unit and determining a compressor discharge pressure upper limit based on the available power. The compressor discharge pressure upper limit is compared to a requested compressor discharge pressure, and an expansion device of the refrigeration unit is adjusted such that an actual compressor discharge pressure is the lesser of the requested compressor discharge pressure or the compressor discharge pressure upper limit.

Additionally or alternatively, in this or other embodiments determining the available power to drive the compressor includes calculating a total engine power estimate of an engine operable connected to the compressor, and subtracting power consumption of other components operably connected to the engine to arrive at the available power to drive the compressor.

Additionally or alternatively, in this or other embodiments the total engine power estimate is a function of one or more of ambient air temperature, ambient air pressure and engine speed.

Additionally or alternatively, in this or other embodiments the requested compressor discharge pressure is a function of one or more of an evaporating temperature of the refrigeration unit, a temperature of a condenser or a gas cooler outlet and a requested temperature of the refrigerated space.

Additionally or alternatively, in this or other embodiments adjusting the expansion device of the refrigeration unit includes computing a pressure difference between a current compressor discharge pressure and the lesser of the requested compressor discharge pressure or the compressor discharge pressure upper limit, and adjusting an expansion device open setting based on the pressure difference, such that the actual compressor discharge pressure is the lesser of the requested compressor discharge pressure or the compressor discharge pressure upper limit.

In another embodiment, a refrigeration unit includes an evaporator circulating a flow of refrigerant therethrough to cool a flow of compartment air flowing over the evaporator, a compressor in fluid communication with the evaporator to compress the flow of refrigerant, an engine operably connected to the compressor to drive operation of the compressor, an expansion device in fluid communication with the flow of refrigerant, and a controller operably connected to at least the engine and the expansion device. The controller is configured to determine an available power to drive the compressor, determine a compressor discharge pressure upper limit based on the available power, compare the compressor discharge pressure upper limit to a requested compressor discharge pressure, and initiate adjustment of the expansion device such that an actual compressor discharge pressure is the lesser of the requested compressor discharge pressure or the compressor discharge pressure upper limit.

Additionally or alternatively, in this or other embodiments determining the available power to drive the compressor includes calculating a total engine power estimate of the engine, and subtracting power consumption of one or more other components operably connected to the engine to arrive at the available power to drive the compressor.

Additionally or alternatively, in this or other embodiments the total engine power estimate is a function of one or more of ambient air temperature, ambient air pressure and engine speed.

Additionally or alternatively, in this or other embodiments the one or more other components include one or more of an evaporator fan disposed at the evaporator or a condenser fan positioned at a condenser in fluid communication with the refrigerant flow.

Additionally or alternatively, in this or other embodiments the requested compressor discharge pressure is a function of one or more of an evaporating temperature of the refrigeration unit, a temperature of a condenser or a gas cooler outlet and a requested temperature of the refrigerated space.

Additionally or alternatively, in this or other embodiments adjusting the expansion device of the refrigeration unit includes computing a pressure difference between a current compressor discharge pressure and the lesser of the requested compressor discharge pressure or the compressor discharge pressure upper limit, and adjusting an expansion device open setting based on the pressure difference, such that the actual compressor discharge pressure is the lesser of the requested compressor discharge pressure or the compressor discharge pressure upper limit.

In yet another embodiment, a refrigerated cargo compartment includes a cargo compartment suitable for transporting a cargo, and a refrigeration unit operably connected to the cargo compartment. The refrigeration unit includes an evaporator circulating a flow of refrigerant therethrough to cool a flow of cargo compartment air flowing over the evaporator to cool the cargo compartment, a compressor in fluid communication with the evaporator to compress the flow of refrigerant, an engine operably connected to the compressor to drive operation of the compressor, an expansion device in fluid communication with the flow of refrigerant, and a controller operably connected to at least the engine and the expansion device. The controller is configured to determine an available power to drive the compressor, determine a compressor discharge pressure upper limit based on the available power, compare the compressor discharge pressure upper limit to a requested compressor discharge pressure, and initiate adjustment of the expansion device such that an actual compressor discharge pressure is the lesser of the requested compressor discharge pressure or the compressor discharge pressure upper limit.

Additionally or alternatively, in this or other embodiments determining the available power to drive the compressor includes calculating a total engine power estimate of the engine, and subtracting power consumption of one or more other components operably connected to the engine to arrive at the available power to drive the compressor.

Additionally or alternatively, in this or other embodiments the one or more other components include one or more of an evaporator fan located at the evaporator or a condenser fan disposed at a located in fluid communication with the refrigerant flow.

Additionally or alternatively, in this or other embodiments the requested compressor discharge pressure is a function of one or more of an evaporating temperature of the refrigeration unit, a temperature of a condenser or a gas cooler outlet and a requested temperature of the refrigerated space.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments, together with advantages and features, by way of example with reference to the drawings.

DETAILED DESCRIPTION

Figure 1:
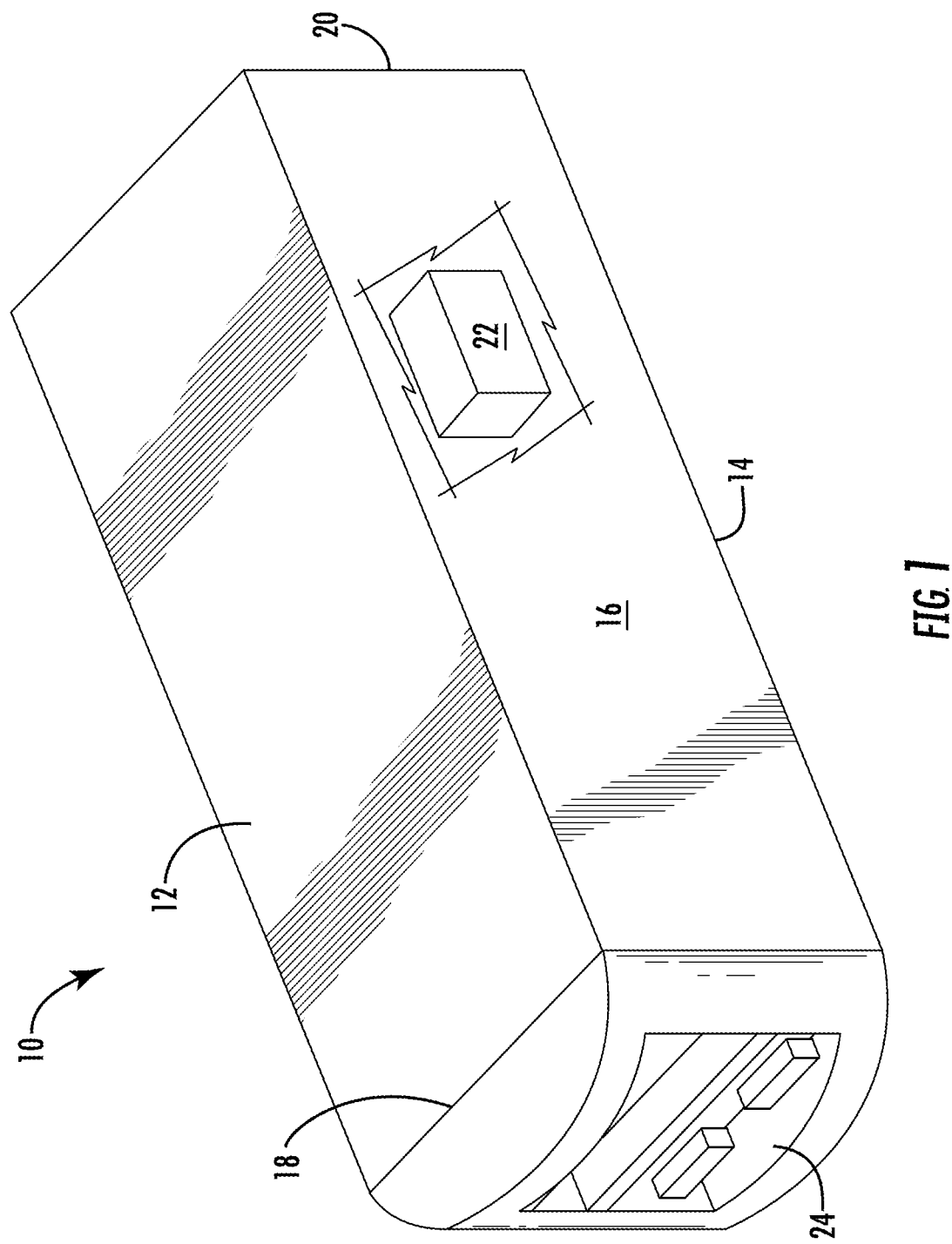
FIG. 1 is schematic view of an exterior of a cargo trailer including a transportation refrigeration system.

Shown in FIG. 1 is an embodiment of a refrigerated cargo compartment 10, for example, a refrigerated truck or trailer. The refrigerated cargo compartment 10 is formed into a generally rectangular construction, with a top wall 12, a directly opposed bottom wall 14, opposed side walls 16 and a front wall 18. The cargo compartment 10 further includes a door or doors (not shown) at a rear wall 20, opposite the front wall 18. The cargo compartment 10 is configured to maintain a cargo 22 located inside the cargo compartment 10 at a selected temperature through the use of a refrigeration unit 24 located at the cargo compartment 10. The cargo compartment 10 is utilized to transport the cargo 22. The refrigeration unit 24 is located at the front wall 18, and includes an evaporator 32 that receives a compartment airflow 34 (shown in FIG. 2) from inside the cargo compartment 10 and cools it via thermal energy exchange between the compartment airflow 34 and refrigerant flowing through the evaporator 32. The cooled compartment airflow 34 is utilized to refrigerate the cargo compartment 10 to a selected temperature. In some embodiments, the selected temperature is in the range of about 30 to 50 degrees Fahrenheit for high or medium temperature refrigeration, while in other embodiments the selected temperature may be between 0 and −30 degrees Fahrenheit for frozen good refrigeration. It is to be appreciated that these temperatures are merely exemplary and that the refrigeration unit 24 described herein may be utilized to achieve a wide range of selected temperatures and further is readily switchable between selected temperatures.

Figure 2:
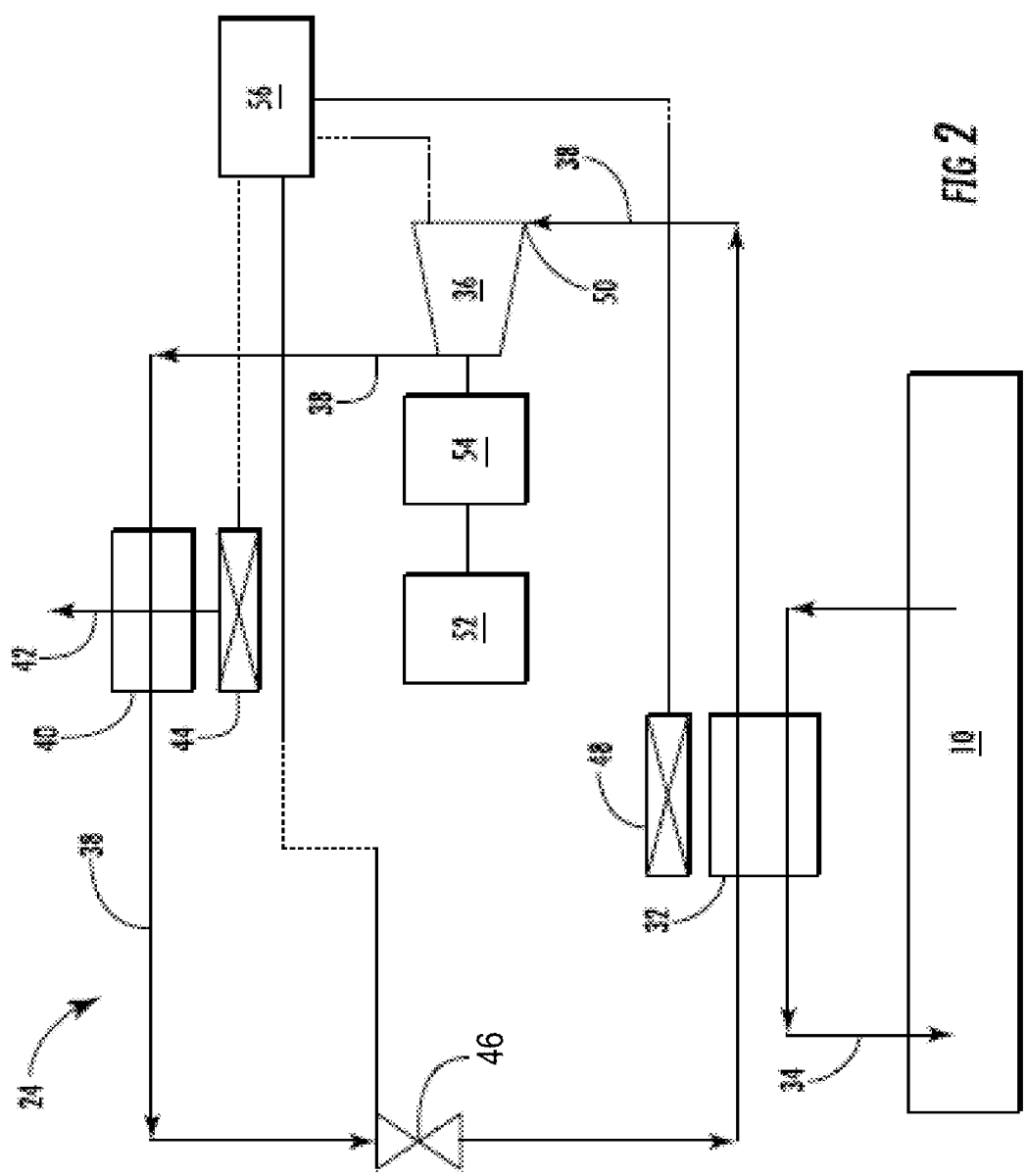
FIG. 2 is a schematic view of an embodiment of a transportation refrigeration system.

Referring now to FIG. 2, the refrigeration unit 24 includes a compressor 36 which may be a vapor injection scroll compressor, or may be a compressor of a different type. The compressor 36 compresses a vapor refrigerant flow 38, and the refrigerant flow 38 changes phase into liquid at a condenser 40 through thermal energy exchange with a condenser airflow 42 flowed across the condenser 40 by a condenser fan 44. The condenser 40 is fluidly connected to an expansion device 46. The expansion device 46 is fluidly connected to the evaporator 32, where the compartment airflow 34 is cooled and the refrigerant flow 38 is boiled through thermal energy exchange at the evaporator 32. In some embodiments, the compartment airflow 34 is urged across the evaporator 32 by one or more evaporator fans 48. The vaporized refrigerant flow 38 is then returned to compressor inlet 50 of compressor 36.

The compressor 36 is powered by a power source, for example, an engine 52, fueled by, for example diesel or natural gas. The engine 52 is connected to the compressor 36 either directly or via an intervening electrical generator 54 as shown to derive AC power to drive the compressor 36. The electrical power generated at the electrical generator 54 may also be utilized to drive the condenser fan 44, the evaporator fan 48 and other auxiliary components of the refrigeration unit. A controller 56 is operably connected to components of the refrigeration unit 24, such as the compressor 36, engine 52, the condenser fan 44, and the evaporator fan 48 to monitor and control their operation.

Figure 3:
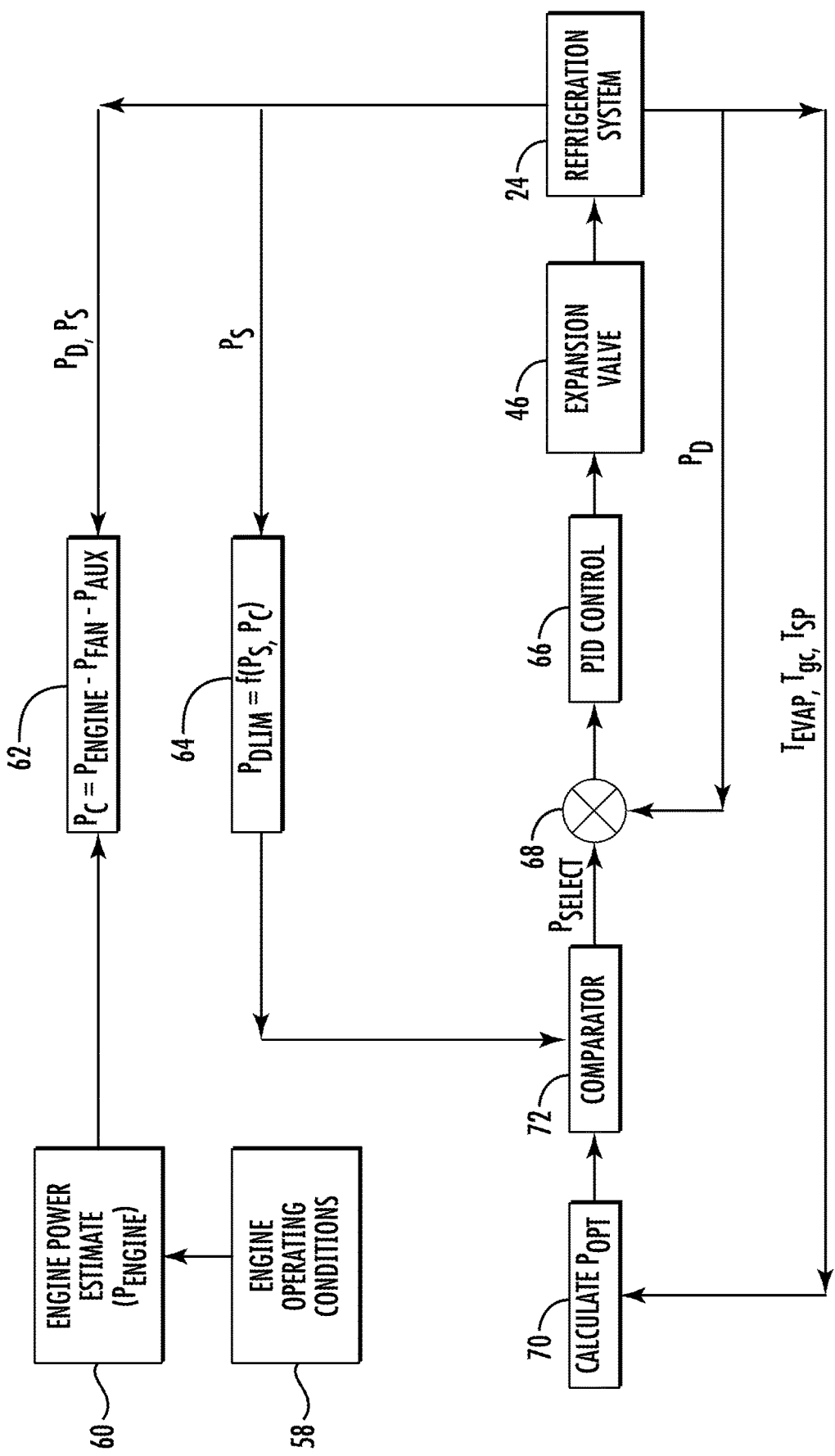
FIG. 3 is a schematic view of an embodiment of a control methodology for a transportation refrigeration system.

Referring now to FIG. 3, an embodiment of a power management control system and method is illustrated for the refrigeration unit 24 is illustrated. In some embodiments, at least some of the steps or processes shown in FIG. 3 are performed at the controller 56. At block 58, refrigeration unit 24 operating conditions such as engine 52 speed and ambient air temperature and/or pressure are collected and used to calculate an engine power estimate ($P_{engine}$) at block 60. From the $P_{engine}$, available power for the compressor ($P_c$) is determined at block 62 by subtracting power needs for the fans 44, 48 ($P_{fan}$) and power needs for other auxiliary components ($P_{aux}$) from the engine power estimate. In some embodiments, the power needs for the fans 48, 48 and the power needs of the other auxiliary components are substantially constant.

The calculated available power for the compressor ($P_c$) is used, together with a compressor suction pressure ($P_s$) to calculate a compressor discharge pressure limit ($P_{Dlimit}$) at block 64, using a compressor power map. In the compressor power map, compressor suction pressure ($P_s$), with the compressor discharge pressure limit ($P_{Dlimit}$) being a function of compressor suction pressure ($P_s$) and the available power for the compressor ($P_c$).

Actual compressor discharge pressure ($P_D$) is controlled by an open positon of the expansion device 46 at a PID control 66 which feeds commands to the expansion device 46. The setting of the PID control 66 is determined by comparing the actual compressor discharge pressure ($P_D$) to a selected compressor discharge pressure ($P_{select}$) at block 68. If $P_{select}$ is less than $P_D$ the PID control 66 commands adjustment of the open position of the expansion device 46 to decrease $P_D$, while if $P_{select}$ is greater than $P_D$ the PID control 66 commands adjustment of the open position of the expansion device 46 to increase $P_D$.

The selected compressor discharge pressure ($P_{select}$) is determined in part by a calculation of an optimal discharge pressure ($P_{OPT}$) utilizing a pressure map at block 70. The pressure map utilizes feedback from the refrigeration unit 24, such as evaporating temperature ($T_{evap}$) and a condenser or gas cooler outlet temperature ($T_{gc}$) along with a set point or desired cargo compartment temperature ($T_{SP}$). The optimal discharge pressure ($P_{OPT}$) is compressor discharge pressure of the refrigeration unit 24, without considering power availability for the compressor 36.

Taking available power for the compressor ($P_c$) into account preserves stall margin of the engine 52, preventing failure or shutdown of the refrigeration unit 24 due to a engine 52 stall. To that end, at comparator block 72, the optimal discharge pressure ($P_{OPT}$) is compared to the compressor discharge pressure limit ($P_{Dlimit}$). Phrased another way, a discharge pressure requested based on condition feedback from the refrigeration unit 24 is compared to a possible discharge pressure based on the ability of the engine 52 to provide power to the compressor 36. If the optimal discharge pressure ($P_{OPT}$) is less than or equal to the compressor discharge pressure limit ($P_{Dlimit}$), the comparator 72 outputs the optimal discharge pressure ($P_{OPT}$) as the selected compressor discharge pressure ($P_{select}$) block 68. Alternatively, if the optimal discharge pressure ($P_{OPT}$) is greater than the compressor discharge pressure limit ($P_{Dlimit}$), the comparator 72 outputs the compressor discharge pressure limit ($P_{Dlimit}$) as the selected compressor discharge pressure ($P_{select}$) to block 68. The select to selected compressor discharge pressure ($P_{select}$) is compared to the actual compressor discharge pressure ($P_D$), and the PID control 66 commands change to the expansion device 46 open setting so that the actual compressor discharge pressure ($P_D$) corresponds to selected compressor discharge pressure ($P_{select}$).

This method runs substantially continuously to modulate the load to accommodate variations in available engine power to the compressor and in compressor discharge pressure requests of the refrigeration unit 24. The system and method disclosed herein allow the refrigeration unit 24 to meet cooling requirements while also maintaining the engine 52 within its operational envelop.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of controlling a refrigeration unit, comprising:
    determining available power to drive a compressor of the refrigeration unit;
    determining a compressor discharge pressure upper limit based on the available power;
    comparing the compressor discharge pressure upper limit to a requested compressor discharge pressure; and
    adjusting an expansion device of the refrigeration unit such that an actual compressor discharge pressure as a result of adjustment of the expansion device is the lesser of the requested compressor discharge pressure or the compressor discharge pressure upper limit;
    wherein determining the available power to drive the compressor includes calculating a total engine power estimate of an engine operably connected to the compressor; and
    wherein the total engine power estimate is a function of engine speed and one or more of ambient air temperature and ambient air pressure;
    wherein the requested compressor discharge pressure is calculated utilizing sensed feedback from the refrigeration unit including at least a sensed temperature of a condenser or a gas cooler outlet and a requested temperature of the refrigerated space.

2. The method of claim 1, wherein determining the available power to drive the compressor further includes subtracting power consumption of other components operably connected to the engine from the total engine power estimate to arrive at the available power to drive the compressor.

3. The method of claim 1, wherein adjusting the expansion device of the refrigeration unit includes:
    computing a pressure difference between a current compressor discharge pressure prior to adjustment of the expansion device and the lesser of the requested compressor discharge pressure or the compressor discharge pressure upper limit; and
    adjusting an open setting of the expansion device based on the pressure difference, such that the actual compressor discharge pressure as a result of adjustment of the expansion device is the lesser of the requested compressor discharge pressure or the compressor discharge pressure upper limit.

4. The method of claim 1, further comprising determining the compressor discharge pressure upper limit based on the available power and a compressor suction pressure.

5. A refrigeration unit, comprising:
    an evaporator circulating a flow of refrigerant therethrough to cool a flow of compartment air flowing over the evaporator;
    a compressor in fluid communication with the evaporator to compress the flow of refrigerant;
    an engine operably connected to the compressor to drive operation of the compressor;
    an expansion device in fluid communication with the flow of refrigerant; and
    a controller operably connected to at least the engine and the expansion device, the controller configured to:
        determine available power to drive the compressor;
        determine a compressor discharge pressure upper limit based on the available power;

compare the compressor discharge pressure upper limit to a requested compressor discharge pressure; and initiate adjustment of the expansion device such that an actual compressor discharge pressure as a result of adjustment of the expansion device is the lesser of the requested compressor discharge pressure or the compressor discharge pressure upper limit;

wherein determining the available power to drive the compressor includes calculating a total engine power estimate of an engine operably connected to the compressor; and wherein the total engine power estimate is a function of engine speed and one or more of ambient air temperature and ambient air pressure;

wherein the requested compressor discharge pressure is calculated utilizing sensed feedback from the refrigeration unit including at least a sensed temperature of a condenser or a gas cooler outlet and a requested temperature of the refrigerated space.

6. The refrigeration unit of claim 5, wherein determining the available power to drive the compressor further includes subtracting power consumption of one or more other components operably connected to the engine from the total engine power estimate to arrive at the available power to drive the compressor.

7. The refrigeration unit of claim 6, wherein the one or more other components include one or more of an evaporator fan disposed at the evaporator or a condenser fan disposed at a condenser in fluid communication with the refrigerant flow.

8. The refrigeration unit of claim 5, wherein adjusting the expansion device of the refrigeration unit includes:

computing a pressure difference between a current compressor discharge pressure prior to adjustment of the expansion device and the lesser of the requested compressor discharge pressure or the compressor discharge pressure upper limit; and adjusting an open setting of the expansion device based on the pressure difference, such that the actual compressor discharge pressure as a result of adjustment of the expansion device is the lesser of the requested compressor discharge pressure or the compressor discharge pressure upper limit.

9. A refrigerated cargo compartment comprising:

a cargo compartment suitable for transporting a cargo; and a refrigeration unit operably connected to the cargo compartment, including:

an evaporator circulating a flow of refrigerant therethrough to cool a flow of cargo compartment air flowing over the evaporator to cool the cargo compartment;

a compressor in fluid communication with the evaporator to compress the flow of refrigerant;

an engine operably connected to the compressor to drive operation of the compressor;

an expansion device in fluid communication with the flow of refrigerant; and a controller operably connected to at least the engine and the expansion device, the controller configured to:

determine available power to drive the compressor;

determine a compressor discharge pressure upper limit based on the available power;

compare the compressor discharge pressure upper limit to a requested compressor discharge pressure; and initiate adjustment of the expansion device such that an actual compressor discharge pressure as a result of adjustment of the expansion device is the lesser of the requested compressor discharge pressure or the compressor discharge pressure upper limit;

wherein determining the available power to drive the compressor includes calculating a total engine power estimate of an engine operably connected to the compressor; and wherein the total engine power estimate is a function of engine speed and one or more of ambient air temperature and ambient air pressure;

wherein the requested compressor discharge pressure is calculated utilizing sensed feedback from the refrigeration unit including at least a temperature of a condenser or a gas cooler outlet and a requested temperature of the refrigerated space.

10. The refrigerated cargo compartment of claim 9, wherein determining the available power to drive the compressor further includes subtracting power consumption of one or more other components operably connected to the engine from the total engine power estimate to arrive at the available power to drive the compressor.

11. The refrigerated cargo compartment of claim 10, wherein the one or more other components include one or more of an evaporator fan disposed at the evaporator or a condenser fan disposed at a condenser in fluid communication with the refrigerant flow.

* * * * *